Feb. 26, 1957  C. W. SUNDBERG ET AL  2,783,081
COMBINED REVEAL MOLDING AND PERMANENT VISOR FOR VEHICLES
Filed Dec. 2, 1953  3 Sheets-Sheet 1
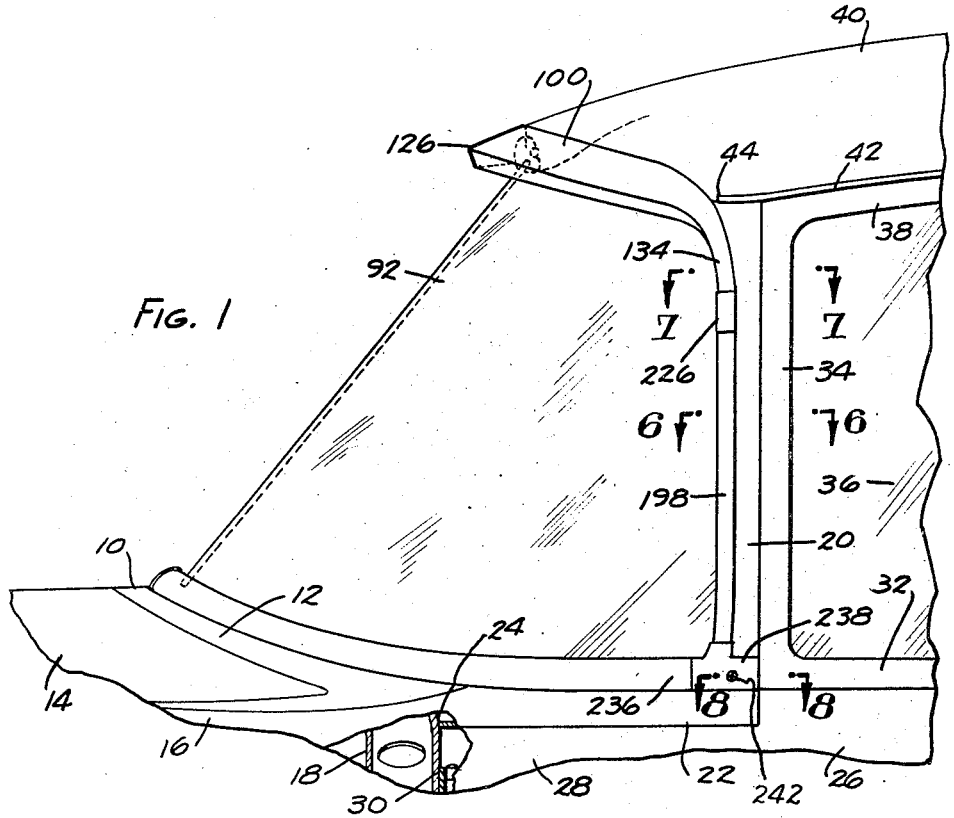
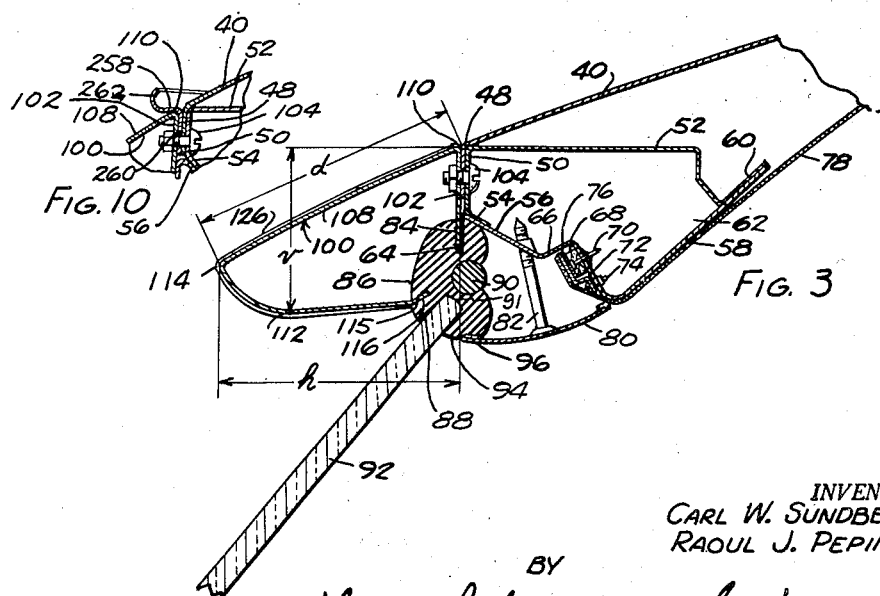
INVENTORS
CARL W. SUNDBERG &
RAOUL J. PEPIN.
BY
Wilson, Redrow, and Gaines
ATTORNEYS.

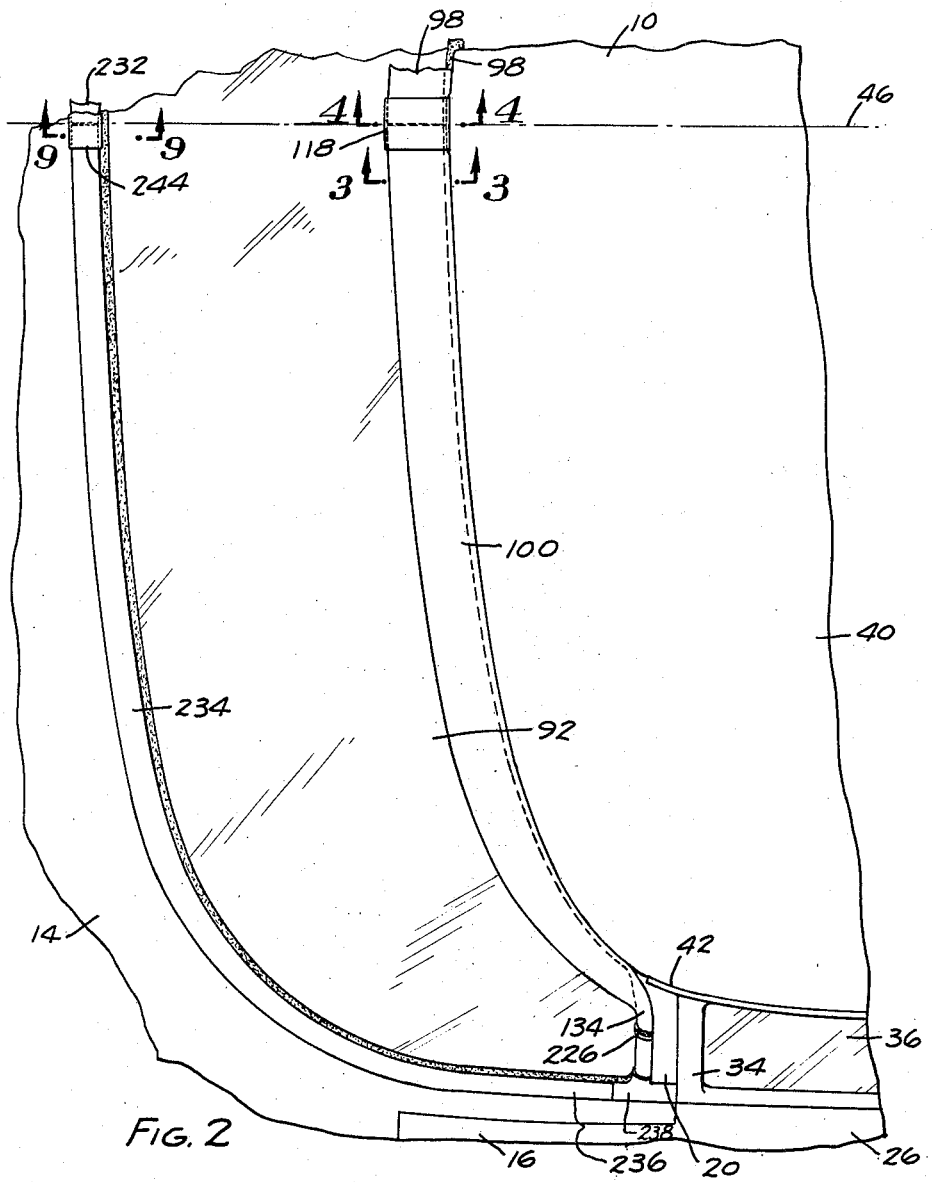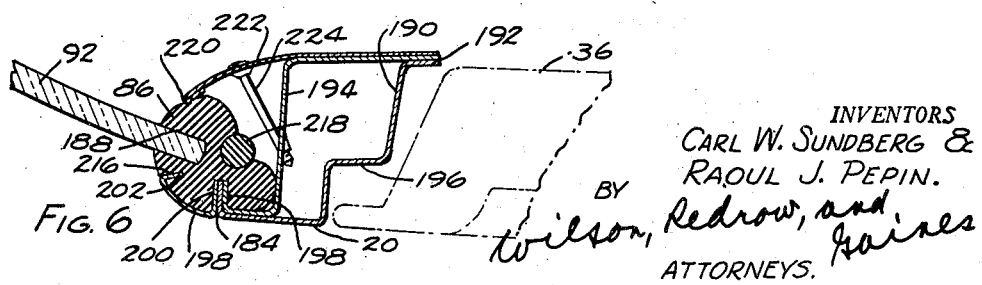

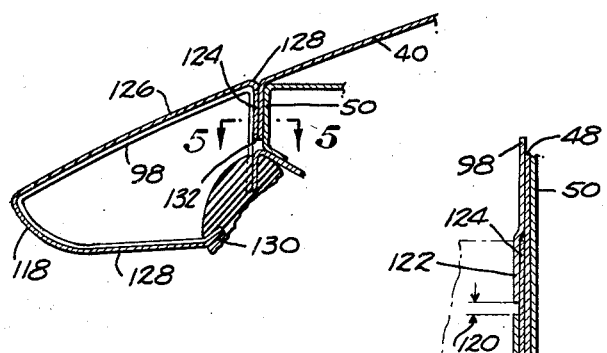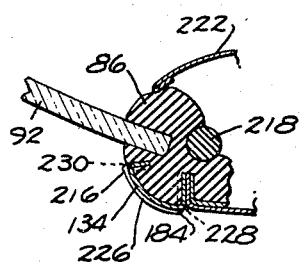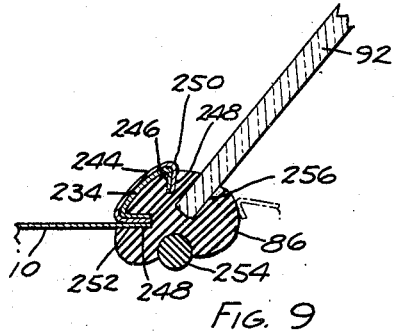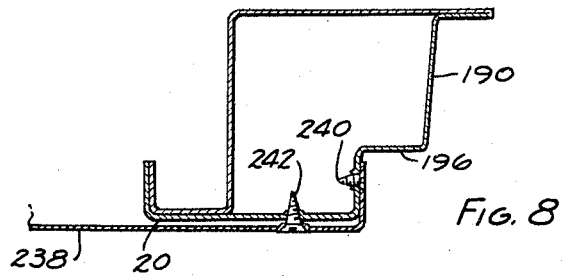

United States Patent Office 2,783,081
Patented Feb. 26, 1957

2,783,081

COMBINED REVEAL MOLDING AND PERMANENT VISOR FOR VEHICLES

Carl W. Sundberg, Birmingham, and Raoul J. Pepin, Ferndale, Mich., assignors to Studebaker-Packard Corporation, a corporation of Michigan Application December 2, 1953, Serial No. 395,733

19 Claims. (Cl. 296—84)

The present application relates to a combined reveal molding and permanent visor for vehicles, particularly to a molding-visor styled so as to preserve in full the motif function of an ornamental reveal molding for vehicle windshield and at the same time couple thereto a second or dual function as performed by a blended-contour permanent visor.

An object of the invention is the provision of a combined molding and visor for an automotive type windshield, which may be fabricated from individual pieces of bright finished sheet metal yet which upon assembly create a unified appearance of permanence and solidarity.

Another object is to provide a complete reveal molding for the four edges of a rubber sealed windshield opening in which the molding uniformly has two angularly converging springy attaching flanges received in companion longitudinal anchoring recesses in the rubber seal and which provides a hollow tubular constructed arrangement at the upper edge of the windshield opening and progressively flares to a maximum cross section at the top of the center of the windshield opening to give its maximum shading effect at that location. According to a feature of the invention the rubber seal has a substantially constant cross section throughout its entire length around the windshield edges and readily lends itself to the economies of an extrusion operation in manufacturing. Nevertheless, however, the tubular varying-cross-section construction of the reveal molding is arranged to be similarly anchored in the uniform-sectioned seal notwithstanding the flared effect of the molding which is pronounced at the top center of the windshield opening.

Another object of the invention is the provision of a combined reveal molding and permanent visor for a rubber sealed automobile windshield and fabricated from pieces of bright sheet metal which form a tubular box like section for the molding and which are preferably secured with their bottom or closing wall anchored in the rubber seal to achieve a stiff rigid construction free from vibration, rattling, and instability even at high automobile and air speeds. The rear wall or back of the tubular box like section is also desirably anchored in a similar manner in the rubber seal and thus adds to the solidness of the construction.

Another object is to provide a permanent windshield visor incorporated in and forming a part of the reveal molding for an enclosed, sloping-roofed automobile body, in which the visor gives the appearance of a blended continuation of the roof thereof so as to enhance and contribute to a long, low silhouette for the automobile body.

An additional object is to provide a multi-piece springy metal molding-visor having a unified singleness of appearance and finish but fabricated from simple rolled sheet pieces of bright metal ornamentation. The molding-visor thus lends itself to certain easily realized economies of manufacture and freedom from close limits of manufacturing tolerances.

Another object of the invention is to provide a combined molding and visor construction for the rubber sealed windshield of a vehicle body wherein the actual visor portion, consistent with the remainder of the molding-visor, has a closing flange which is securely anchored in the rubber seal and eliminates the unwanted characteristics of a commonly used freely depending visor lip which in certain known visor constructions gives rise to wind howl and whistle as the vehicle body is moved through air at high speeds.

Further features, objects and advantages will either be specifically pointed or become apparent when, for a better understanding of the invention, reference is made to the following written description taken in conjunction with the accompanying drawings in which:

Figure 1 is a side elevational view of automotive vehicle windshield structure embodying the molding-visor of the present invention;

Figure 2 is a top plan view of the invention of Figure 1;

Figures 3 and 4 are sectional showings along the lines 3—3 and 4—4 of Figure 2;

Figure 5 is a sectional showing along lines 5—5 of Figure 4;

Figures 6, 7, 8 are sectional showings along lines 6—6, 7—7 and 8—8 of Figure 1;

Figure 9 is a section taken along the lines 9—9 in Figure 2, and

Figure 10 is a fragmentary showing corresponding to Figure 3 but showing a slight modification of the invention.

In Figures 1–9 of the drawings, an enclosed-body type automotive vehicle 10 is shown having a transversely disposed cowl 12, an alligator type bonnet or hood cover 14 hinged at its rear end adjacent the cowl 12 so as to swing upwardly about a horizontal axis in known manner, and a pair of left and right front fenders, one of which is shown at 16. The cowl 12 has a frame work including a pair of vertically disposed cowl sides 18, one at each side of the vehicle 10 and welded at their bases to a chassis-supported sill reinforced floor pan, not shown. At each side of the vehicle 10 a substantially vertical windshield pillar 20 is provided having a horizontally disposed transverse offset 22 therein which extends forwardly to a point of welded juncture with the supporting cowl side 18 and indicated by a weld as at 24. At each side, the vehicle 10 has a front door such as at 26 provided with a forward continuation 28 included in the angle between the offset pillar portion 22 and the cowl side 18. The forward continuation 28 of the door is secured by a pair of vertically spaced hinges such as at 30 to the cowl side structure 18 so as to swing about a substantially vertical axis adjacent the forward edge of the door. Each of the front doors 26 incorporates a belt line defining strip 32 which may be formed of stainless steel or other chrome-plated ornamentation, and has a window frame such as at 34 which extends above the belt line strip 32 and slidably or pivotally or otherwise receives a glass window panel such as at 36 which in its adjusted closed position engages a transverse window frame portion 38 carried by the door 26 at the top thereof. The pair of opposed windshield pillars 20 is connected at the upper end to the opposite front corners of a downwardly sloping pressed steel roof panel 40 forming a permanent top for the enclosed body of the vehicle 10. Along the side edges of the roof panel 40 an upwardly open rain gutter 42 is provided having a terminal portion 44 disposed at a location adjacent the upper front corner of the steel top 40. The vehicle 10 is symmetrical about a longitudinal center line indicated at 46 and in the interests of brevity only the left front side of the vehicle windshield structure will be hereinafter described in detail.

According to Figure 3 the downwardly sloping roof panel 40 has a down-turned substantially vertical flange 48 which is overlapped with a vertically disposed wall portion 50 incorporated in a transverse reinforcing member 52 which is carried at the forward edge of the roof panel. The wall portion 50 of the reinforcing bracket 52 terminates in a diagonally rearwardly disposed depending flange 54. The flange 54 is overlapped with and welded to an inclined wall 56 presented by a companion transverse reinforcing member 58 under the roof panel 40. The companion reinforcing members 52 and 58 have a pair of adjacent flanges 60 at the rear which are welded together to form a closed hollow box-like section 62 extending across and beneath the forward edge of the roof panel 40. The lower companion member 58 includes a down-turned flange 64 which is outside of and forms an external angle with respect to the general box-like cross section 62. A rabbeted portion 66 is formed in the lower companion member 58 and receives a head lining tacking strip 68 of soft fabric or paper composition which is secured thereto by a plurality of spaced apart brad-like fasteners 70. A hidden-type head lining retained strip 72 of bendable metal is secured as by a set of screws 74 to the rabbeted portion 66 and carries a set of spaced apart head lining piercing teeth 76 adjacent the outermost edge of the tacking strip 68. A piece of fabric head lining 78 for the interior of the vehicle roof 40 has its forward end wedged between the teeth 76 of the head lining retainer 72 and the tacking strip 68 and is adapted to be permanently pierced and held by the former when the tooth-carrying edge of the bendable retainer strip 72 is hammered into place as by a blunt tool in well known manner. A garnish molding 80 may be provided which is held in place as by a plurality of screw fasteners 82 which threadably engages the inclined wall portion 56 of the reinforcing member 58.

The previously noted down-turned flange 64 on the reinforcing member 58 is received in a longitudinal groove 84 formed in a non-metallic deformable seal 86 which may be of relatively soft rubber, elastic plastic, synthetic resins or other elastomeric material such as neoprene suitable for sealing a windshield glass. The seal 86 has a longitudinal recess or slot 88 therein having a width which is relatively adjustable prior to the introduction of a round sectioned locking element 90 for the seal 86. The locking element 90 is preferably formed of the same material as the seal 86 and when forced into place serves to crowd the rubber of the seal 86 and tend to decrease the width of the recess 88. The recess 88 receives the top edge 91 of a one-piece curved glass windshield 92 which covers the entire windshield opening bounded by the cowl 12, the windshield pillars 20 and the forward reinforcing structure of the roof panel 40. Application of the locking element 90 serves in known manner to squeeze up and compress the rubber of the seal 86 into water tight relationship around the edges of the one-piece windshield glass 92. A shallow longitudinally extending depression 94 may be provided in the seal 86 to receive the forward reversely bent edge 96 of the garnish molding 80.

A combined reveal molding and visor structure is provided to cover and conceal most of the exterior of the rubber seal 86 and at the same time to shade an upper portion of the windshield glass 92. Such structure is formed of a plurality of generally springy pieces of rolled sheet metal and preferably having the bright appearance provided as by stainless steel or other bright plated or chrome coated sheet metal. A symmetrically identical pair of horizontally disposed left and right pieces 98, 100 is arranged in end to end abutting relationship to form a bow-shaped or arched visor member disposed above the glass 92. Each piece, for instance the left piece 100, is in the general form of a tubular hollow box-like section having its maximum dimension at the center or arch portion of the visor member and includes a vertically disposed attaching flange portion 102 which is secured as by a plurality of screw fasteners 104 to the down-turned flange 48 of the roof panel and to the reinforcing member 52 beneath the roof panel. The terminal of the flange 102 is juxtaposed to the down-turned flange 64 on the reinforcing member 58 and shares therewith an anchored position within the longitudinal recess 84 in the seal 86. A forwardly and downwardly sloping visor portion 108 has a juncture at 110 with the attaching flange portion 102 and forms a smooth continuation of the downwardly sloping contour of the roof panel 40. A horizontally disposed closing portion 112 completes the tubular box-like structure and assumes a gutter-like or trough-like shape in which the transversely opposite edges are turned diagonally upwardly and outwardly. At one side of the gutter the closing portion 112 forms approximately a 90° or right angled juncture at 114 with the visor portion 108 and at its opposite side the closing gutter portion 112 has a terminal flange 115 received in a longitudinal anchoring recess 116 formed in the seal 86. The closing gutter portion 112 as noted particularly in Figure 3 has a generally curvilinear contour of gradual sweep at each of its transversely opposite edges. The terminal portion 115 is angularly related to but predeterminedly spaced apart with respect to the terminal edge of the attaching flange portion 102 and leaves open the bottom or rear side edge of the hollow box-like member 100; the hollow box-like member 100 is thus unclosed on itself and has the rubber seal 86 in the resulting gap between the convergingly angled anchoring flange portions 102, 115.

Overlapping means may be provided for smoothly joining together the adjacent registering ends of the left and right pieces 98, 100 to give the appearance of a neat splice. Illustrative of one example of overlapping means is a narrow bracket 118 according to Figures 4 and 5 and formed preferably of stainless steel or other bright plated or chrome coated springy sheet metal. For convenience in assembly the left and right pieces 98 and 100 are arranged to have a predetermined clearance gap indicated at 120 and are transversely offset for a predetermined distance adjacent the gap as indicated at 122. Within the offset provided at 122 an attaching flange portion 124 of the bracket 118 is firmly wedged in place. The bracket 118 has a diagonal portion 126 which forms a juncture at 128 with the attaching flange portion 124 and a closing gutter portion 128 which is integrally joined to the visor portion 126. The adjacent ends of the pieces 98, 100 are thus nested within the bracket 118 and the terminal flanges such as at 130 and 132 on the latter are wedged into the corresponding longitudinal recess 84 and 116 formed in the seal 86. The pieces 98, 100 forming the arched visor member are of gradually tapered cross section decreasing from a maximum at the center of the arch according to Figure 3 to a minimum at the extremities of the arch which terminate on the opposite sides of the visor in a pair of down-turned legs, one of which is shown at 134. The down-turned legs 134 conform generally to the sides of the windshield opening for receiving the glass 92.

In one contemplated construction of the illustrative form of the invention according to Figure 3, the developed dimension indicated at $d$ amounted to a three inch continuation of the roof panel 40 provided solely by the molding-visor. As illustrative of the proportions of the hollow box-like section the projected horizontal overhang indicated indicated at $h$ past the upper edge of the windshield 92-a at $h$ past the upper edge of the windshield 92 was a measurement 50% in excess of the measured projected vertical depth $v$, all measurements being taken at the center of the arch.

In Figure 6 the seal 86 in the vicinity of the windshield pillar 20 is substantially the same if not identical in cross section as it appears in the showing of the preceding Figure 3. The seal has a wide longitudinal groove 188 which receives the side edge of the curved glass 92 and further includes a longitudinally extending anchoring recess 184. The windshield pillar 20 which forms the sides of the windshield opening on the opposite sides of the vehicle 10 is of box-section and includes a jamb member 190 which is welded as at 192 to a closing member 194 of right angled construction. The jamb member is rabbeted as at 196 to accommodate the companion upper frame portion 36 of the front door 26. The closing member 194 and the jamb member 190 have a pair of internested reversely bent flanges 198 which are welded together and are together received in the longitudinal recess 184 in the seal 86. Adjacent the recess 184 in the seal 86, there is provided a springy reveal strip 198 which is formed preferably of stainless steel or other bright plated or chrome coated sheet metal. The strip 198 extends downwardly to the general vicinity of the belt line lever as at 32 and at its upper end is of substantially identical cross section to the downturned legs 134 on the arched box-like visor moulding. The strip 198, one of which is provided at each side of the windshield, has an anchoring flange portion 200 inserted in the longitudinal recess 184 in juxtaposition to the welded-together flanges 198. Another anchoring flange 202 is convergingly angularly related to the flange portion 200 on the strip 198 securing the same in another longitudinal recess 216 formed in the seal 86. Insertion of the anchoring flanges of the strip 198 within the recesses in the rubber seal 86 and also the insertion of the anchoring flanges of the visor pieces 98, 100 in the rubber seal 86 is rendered relatively a simple matter in view of the springiness of the rolled sheet metal out of which the respective parts 98, 100 and 198 are formed. The seal 86 in Figure 6 has a longitudinal locking element 218 having a general circular cross section and corresponding to the seal locking element 90 shown in Figure 3. A slight longitudinal depression at 220 in the seal 86 receives a reversely bent and doubled portion of a garnish molding 222 which may be secured to the closing member 194 as by a plurality of spaced apart screws 224.

Overlapping means may be provided for smoothly joining together the adjacent registered ends of the depending legs 134 and the strips 198 to give the appearance of a neat splice.

Illustrative of one example of overlapping means is a narrow bracket 226 according to Figure 7 formed preferably of stainless steel or other bright plated or chrome coated springly sheet metal. The bracket 226 has a pair of converging spaced apart anchoring flanges 228 and 230 which are received in the longitudinal grooves 184, 216 in company with the corresponding flanges on the leg portion 134 and the side strip 198, the latter two being in closely spaced adjacency in their end to end registering position. A two-piece reveal molding bottom strip best seen in Figures 1 and 2 is provided which has left and right halves 232 and 234. Each half is symmetrical with respect to the center line 46 of the vehicle and is of uniform cross section throughout its length. The adjacent ends of the strips 234, 232 register with one another in closely spaced adjacency and at their outer ends the pieces 232, 234 are backwardly bent and are contained substantially in the horizontal plane of the vehicle belt line indicated at 32. These backwardly bent ends have bowed terminals 236 which terminate adjacent the bottoms of the side strips 198.

Overlapping means may be provided to give a smooth appearance to the juncture between the terminals 236 and the bottom of the reveal molding side strips 198.

Illustrative of one example of overlapping means is a T-shaped bracket 238 best seen in Figures 1 and 8 and formed of stainless steel or other bright plated or chrome coated springly sheet metal. The strip 198 is complementally nested within the vertical shank of the bracket 238 and the terminal 236 is complementally nested within the lower forward arm of the bracket 238. The lower rear arm of the bracket 238 is bent into the rabbeted portion 196 of the door jamb 190 and secured thereto as by a screw 240. An additional bracket securing screw may be provided at 242 in order to attach the bracket 238 firmly to the outside of the body pillar 20.

Overlapping means may be provided for smoothly joining together the adjacent registered ends of the left and right bottom molding strips 232, 234 to give the appearance of a neat splice.

Illustrative of one example of overlapping means is a narrow bracket 244 according to Figure 9 which is formed preferably of stainless steel or other bright plated or chrome coated springly sheet metal. Each of the reveal molding strips 232, 234 has a pair of converging inturned attaching flanges 246 received in a spaced apart pair of longitudinal recesses 248 formed in the rubber seal 86. Similarly, the overlapping bracket 244 has a pair of inturned flanges 250 which are wedged into the recesses 248 so as to hold the adjacent ends of the pieces 232 and 234 nested therein and hidden from view. The cowl 10 has a diagonally rearwardly extending terminal flange 252 which likewise is received in the recess 248 to define the inner margin of the window opening and to support the seal 86 thereupon. The seal 86 includes a deformable locking element 254 and a wide glass receiving longitudinal groove 256 for receiving the lower edge of the bow-shaped one-piece glass 92.

In the modified embodiment of the invention according to Figure 10, the downwardly sloping roof panel 40 has a vertically disposed flange 48 depending in a manner similar to the flange of the roof panel 40 in the embodiment of Figure 3. Similarly also the depending flange 48 is juxtaposed to a vertical wall portion 50 presented by a transverse reinforcing member 52 which supports the front edge of the roof panel 40. A diagonal terminal flange 54 carried by the wall 50 is overlapped with and secured to a diagonal wall portion 56 of a companion reinforcing member 58. Likewise the embodiment of Figure 10 includes a bow-shaped visor member produced by two pieces, one of which is indicated at 100, and having a diagonal visor portion 108. The visor portion 108 is integrally joined at a juncture line 110 to a depending attaching flange portion 102 for the piece 100. The depending flange 102 is in closely spaced adjacency to the depending flange 48 for the roof panel 40 and together they have an interposed reversely bent member 258 provided with an anchoring flange 260 clamped between the flanges 102 and 48. A plurality of spaced apart threaded fasteners such as at 104 secure the wall 50 and the flanges 48, 260 and 102 together in a compact stack. The reversely bent member 258 extends completely across the top portion of the box section visor member and has an outer portion forming a rain gutter 262, the ends of which may conveniently terminate in fitted registration as with the terminal ends 44 of the rain gutter 42 shown in Figure 1. The purpose of the gutter 262 is to prevent an excess amount of water drip over the visor member formed by the bow-shaped pieces 98, 100.

As herein disclosed, the tubular hollow box section molding-visor is arranged to have a projected horizontal overhang at the center thereof past the upper edge 91 of the glass 92 which is 50% in excess of the projected vertical depth thereof and having a developed length of approximately three inches in the direction of the downwardly sloping roof panel 40. It is evident that considerably more overhang may be realized with the design without introducing an unsteady structure susceptive to vibration and wind displacement, one feature of the design being the firmly anchored flanges of the tubular box-like section which are supported in the rubber seal recesses; thus the rubber itself gives rise to a very desirably rigid construction but indeed it is not in every instance essential to the invention that a substantial amount of overhang be employed, in which instance it may be found an expedient not to anchor the terminal flanges of the closing portion of the box-like visor in the rubber. So also the drawing shows a substantially vertically disposed windshield pillar and an overhung type door which continues there forward, but self-evidently the windshield pillar may be arranged to have a forwardly tilted or rearwardly tilted inclination and the door may be supported so as to swing at a location along the extended longitudinal axis of the windshield pillar.

Variations within the spirit and scope of the invention described are equally comprehended by the foregoing description.

What is claimed is:

1. For use with a glass-covered windshield opening defined by a downwardly sloping roof panel and metal frame structure provided with a longitudinally recessed rubber reveal seal supported thereby along the four edges of the windshield opening, a combined reveal molding and permanent visor structure formed of pieces of bright sheet metal and comprising an arched member adapted to occupy a substantially horizontal plane adjacent the upper edge of the windshield opening and having depending legs bent at its opposite ends to conform to the downward direction of the sides of the window opening, said arched member being of a unitary hollow box-like cross section open at the lower rear corner, and having a plurality of portions including a substantially vertically disposed attaching flange portion forming the rear side of the box section and adapted to be secured to the roof panel, an overhanging visor portion diagonally related to the attaching flange portion and forming a blended substantially overhung continuation of the downwardly sloping roof panel beginning at the juncture between the just-named two box section portions, and a generally curvilinear-sectioned third portion bent to a partially trough-like shape and forming a substantially 90° junction with the visor portion at one side to form a terminal flange at the rear open corner of the box-like section and adapted to engage a longitudinal recess in the rubber reveal seal, said box-like section of the arched member being of a gradually decreasing cross section from a maximum at the central portion of the arch to a relative minimum at the aforesaid legs, and reveal molding side pieces of a substantially equivalent cross section with respect to the just-noted legs of the arched member, each side piece being disposed in end to end relationship with the leg at that side and adapted to have neither a substantial overhang nor consequent unoccupied hollow void therein.

2. For use with a glass covered windshield opening defined by a downwardly sloping roof panel and metal frame structure provided with a longitudinally recessed reveal seal supported thereby along the four edges of the windshield opening, a combined reveal molding and permanent visor structure formed of pieces of chrome sheet metal and comprising an arched member adapted to occupy a substantially horizontal plane adjacent the top edge of the windshield opening and having depending legs at its opposite ends curved to conform to the side edges of the windshield opening, said arched member being of an unoccupied hollow box-like cross section open at the lower rear corner, there being a substantially vertically disposed attaching flange portion forming the rear side of the box section and adapted to be secured to the roof panel, an overhanging visor portion diagonally related to the attaching flange portion and forming a blended continuation of the downwardly sloping roof panel beginning at the juncture between the two said box section portions, a generally curvilinear portion bent to a general trough-like shape forming a substantially right angled junction with the visor portion and being extended at the opposite side of the trough to form a terminal flange at the open rear corner of the box-like section and adapted to engage a longitudinal recess in the reveal seal, said box-like section of the arched member being of a gradually tapered decreasing cross section from a maximum at the central portion of the arch to a relative minimum at the legs thereof, the projected horizontal overhang thereof being in excess of approximately 50% greater than the projected vertical depth of the member at the center of the arch, and reveal molding side pieces of a substantially equivalent cross section with respect to the just-noted legs of the arched member and forming a continuation of the same adapted to have neither a substantial overhang nor consequent unoccupied hollow void therein.

3. For use with a glass containing windshield opening defined by a downwardly sloping roof panel and metal frame structure provided with a longitudinally recessed rubber reveal seal supported thereby along the four edges of the windshield opening, a combined reveal molding and permanent visor structure formed of pieces of decorative sheet metal comprising an arched member adapted to be disposed substantially horizontally adjacent the upper edge of the windshield opening and having depending legs at its opposite ends curved to conform to the inclination of the side edges of the windshield opening, said arched member being of a unitary hollow box-like cross section which is unclosed on itself at the lower rear corner, and having a substantially vertically disposed attaching flange portion forming the rear side of the box section and adapted to be secured to the roof panel, an overhanging visor portion diagonally related to the attaching flange portion to form a blended continuation of the downwardly sloping roof panel beginning at the juncture between the two-named box section portions, and a generally curvilinear third portion bent to a general trough-like shape forming a substantially 90° juncture with the visor portion at one side of the trough and extending at its opposite side to form a terminal flange at the open rear corner of the box-like section and adapted to engage a longitudinal recess in the rubber seal, said box-like section of the arched member being tapered so as to decrease gradually from a maximum cross section at the central portion of the arch to a relative minimum at the legs thereof adjacent the sides of the windshield opening.

4. For use with a glass containing windshield opening defined by a downwardly sloping roof panel and metal frame structure provided with a rubber reveal seal supported thereby along the four edges of the windshield opening, a combined reveal molding and permanent visor structure formed of sheet metal pieces and comprising a member arched to conform to a substantially horizontal plane adjacent the top edge of the windshield opening and having depending legs at its opposite ends directed to conform to the contour of the side edges of the windshield opening, said arched member being of an unoccupied hollow box-like cross section which is unclosed on itself at the lower rear corner, and being formed of a plurality of portions including a substantially vertically disposed attaching flange portion forming the rear side of the box section and adapted to be connected to the roof panel, an overhanging visor portion diagonally related to the attaching flange portion and forming a substantially overhung blended continuation of the downwardly sloping roof panel beginning at the juncture between the two said box section portions, and a third generally curvilinear portion bent to a partially flat gutter shape forming a substantially 90° juncture with the visor portion at one side of the gutter and extending at the opposite side of the gutter to form a terminal flange at the noted lower rear corner of the box-like section, said box-like section of the arched member being of a gradual taper so as to decrease in cross section from a maximum at the central portion of the arch to a relative minimum at the legs thereof, and a reveal molding side piece adapted to be carried by the reveal seal in disposition end to end with respect to the leg at that side and being of a similar cross section with respect to the latter and adapted to have neither a substantial overhang nor consequent unoccupied hollow void therein.

5. For use with a glass receiving windshield opening defined by a downwardly sloping roof panel and metal frame structure provided with a longitudinally recessed rubber reveal seal supported thereby along the four edges of the windshield opening, a combined reveal molding and permanent visor structure formed of pieces of bright sheet metal and comprising an arched member disposed in a substantially horizontal plane adjacent the upper edge of the windshield opening and having depending legs at its opposite ends which conform to the side edges of the windshield opening, said arched member being of a unitary hollow box-like cross section open at the lower rear corner, said box-like cross section being formed of a substantially vertically disposed rear attaching flange portion adapted to be secured to the roof panel, an overhanging visor portion diagonally related to the attaching flange portion and forming a blended continuation of the downwardly sloping roof panel beginning at the juncture between the two said portions, and a third generally curvilinear portion bent to a general trough-like shape forming a substantially right angled juncture with the visor portion at one side of the trough and extending at its opposite side to form a terminal flange at the open rear corner of the box-like section and adapted to be received within a longitudinal recess in said rubber seal, said box-like arched member being of a tapering cross section gradually decreasing from a maximum at the central portion of the arch to a relative minimum at the legs thereof, a reveal molding side piece disposed end to end with the leg at that side and being of a similar cross section, said side pieces being arranged to present neither substantial overhang nor a consequent unoccupied hollow void therein, and a bottom reveal molding member arched in a substantially horizontal plane adjacent the bottom edge of the windshield opening and having curved legs extending backwardly toward the sides of the windshield opening and each terminating adjacent the bottom of the side piece at that side.

6. For use with a glass receiving window opening defined by a downwardly sloping roof panel and metal frame structure provided with a longitudinally recessed reveal seal supported thereby along the four edges of the window opening, a combined reveal molding and visor structure incorporating springy metal pieces formed of rolled sheet metal and comprising an arched member disposed in a substantially horizontal plane adjacent the top edge of the window opening and having depending legs at its opposite ends which conform to the sides of the window opening, said arched member being of a hollow one-piece box-like cross section which is unclosed on itself at the lower rear corner, said one-piece box section being formed of a substantially vertically disposed attaching flange portion at the rear side of the box section adapted to be secured to the roof panel, an overhanging visor portion diagonally related to the attaching flange portion and forming a continuation of the contour of the downwardly sloping roof panel beginning at the juncture between the just-named box section portions, a third portion bent to the shape of a generally flat gutter and forming an angular junction with the visor portion at one side of the gutter and extending at its opposite side to form a terminal flange at the noted lower rear corner of the box-like section, said box-like arched member being of a reversely tapered cross section flaring from a minimum at the leg to a relative maximum at the central portion of the arch, and a reveal molding side piece disposed end to end with respect to the leg at that side and being of a similar cross section commonly adapted to have neither a substantial overhang nor consequent unoccupied hollow void therein.

7. For use with a glass receiving windshield opening defined by downwardly sloping roof panel and metal frame structure, the combination of a longitudinally recessed non-metallic deformable reveal seal supported thereby along the four edges of the windshield opening and a combined reveal molding and permanent visor structure incorporating pieces formed of rolled chrome sheet metal and comprising and arched member disposed in a substantially horizontal plane adjacent the upper edge of the windshield opening, said arched member having depending legs at its opposite ends which conform to the sides of the window opening and being of a unitary unoccupied hollow box-like cross section which is unclosed on itself at the lower rear corner, there being a vertically disposed attaching flange portion adapted to be secured to the roof panel and forming the rear side of the box section and presenting a depending flange terminal engaged in a longitudinal recess in said seal, an overhanging visor portion diagonally related to the attaching flange portion to form a substantially overhung blended continuation of the downwardly sloping roof panel beginning at the juncture between the two said box section portions, and a third portion bent to a general gutter shape to form a substantially 90° junction with the visor portion at one side of the gutter and extending at its opposite side to form a terminal flange at the noted lower rear corner and anchored in another longitudinal recess in the seal, said box-like section and seal cooperating to form a tapering enclosure of decreasing cross section from a maximum at the central portion of the arch to a relative minimum at the legs thereof, and a reveal molding side strip disposed end to end with each leg and being of a similar cross section with a flange received in each corresponding longitudinal recess in the seal, each said strip presenting neither a substantial overhang nor consequent hollow void enclosed thereby.

8. For use with a glass receiving windshield opening defined by downwardly sloping roof panel and metal frame structure, the combination of a longitudinally slotted deformable reveal seal supported thereby along the four edges of the windshield opening and receiving the corresponding four edges of the windshield glass so as to form a water-tight seal therewith, and a combined reveal molding and permanent visor structure incorporating pieces formed from chrome sheet metal and comprising an arched member arranged for disposition in a substantially horizontal plane adjacent the upper edge of the windshield opening, said arched member being of a unitary hollow box-like cross section unclosed on itself at the lower rear corner thereof, said box-section being formed of a substantially vertically disposed attaching flange adapted to be secured to the roof panel and providing the rear side of the box section and presenting a depending flange terminal anchored in a longitudinal slot in the seal, an overhanging visor portion diagonally related to the attaching flange portion to form a blended continuation of the downwardly sloping roof contour beginning at the junction between the two-named box portions, and a third portion of gutter-like shape forming a substantially right angled juncture with the visor portion at one side of the gutter and extending at its opposite side to form a terminal flange at the lower rear corner aforesaid and anchored in another longitudinal slot in the seal, said box-like member and seal cooperating to form an unoccupied hollow enclosure of tapered cross section gradually decreasing from a maximum at the central portion of the arch to a relative minimum at the legs thereof, the projected horizontal overhang of said box-like member past the upper edge of the glass at the center of the arch being approximately 50% greater than the projected vertical depth of the member.

9. For use with a glass receiving windshield opening defined by a downwardly sloping roof panel and metal frame structure, the combination of a longitudinally recessed deformable reveal seal supported thereby along the four edges of the windshield opening and receiving the corresponding four edges of the windshield glass so as to form a water-tight seal therewith, and a combined reveal molding and permanent visor structure incorporating pieces formed from chrome sheet metal and comprising an arched member arranged for disposition in a substantially horizontal plane adjacent the upper edge of the windshield opening, said arched member being of a unitary hollow box-like cross section unclosed on itself at the lower rear corner thereof, said box section being formed of three portions consisting of a substantially vertically disposed attaching flange portion adapted to be secured to the roof panel and providing the rear side of the box section and presenting a depending flange terminal anchored in a longitudinal recess in the seal, an overhanging visor portion diagonally related to the attaching flange portion to form a blended continuation of the downwardly sloping roof contour beginning at the junction between the two-named box portions, and a third portion of gutter-like shape forming a substantially right angled juncture with the visor portion at one side of the gutter and extending at its opposite side to form a terminal flange at the lower rear corner aforesaid and anchored in another longitudinal recess in the seal, said box-like member and seal cooperating to form an unoccupied hollow enclosure of tapered cross section gradually decreasing from a maximum at the central portion of the arch to a relative minimum at the legs thereof, the projected horizontal overhang of said box-like member past the upper edge of the glass at the center of the arch being in excess of approximately 50% greater than the projected vertical depth of the member, a reveal molding side strip disposed end to end to each leg having a similar cross section with respect thereto and adapted to have neither a substantial overhang nor consequent unoccupied hollow enclosure therein, and a bottom reveal molding member adapted to be arched in a substantially horizontal plane adjacent the lower edge of the windshield opening and having curved legs extending back toward the sides of the opening and each terminating adjacent the bottom of the side strip at that side.

10. An arched member adapted to be incorporated in a combined reveal molding and visor structure for the windshield of a vehicle having a downwardly sloping roof panel terminating adjacent the top of the windshield opening, said arched member being formed of two principal pieces comprising left and right halves each piece of which is symmetrical with respect to the other and adapted to be disposed in a generally horizontal plane in juxtaposition end to end at the center of the arch, each piece being of a generally hollow box-like cross section which is unclosed on itself at the lower rear corner, there being a substantially vertically disposed attaching flange portion forming the rear side of the box section of each piece and adapted to be secured to the roof panel, an overhanging visor portion diagonally related to the attaching flange portion to form a blended continuation of the downwardly sloping roof panel contour beginning at the juncture between the two-said box section portions, and a third generally curvilinear portion bent to a flat gutter shape and forming a substantially right angled juncture with the visor portion at one side of the gutter and extending at its opposite side to form a terminal anchoring flange at the noted lower rear corner, said box-like section of each principal piece of the arched member being of a tapering cross section decreasing from a maximum at the central portion of the arched member to a relative minimum at the extremities thereof.

11. An arched member adapted to be incorporated in a combined reveal molding and visor structure for the windshield of a vehicle having a downwardly sloping roof panel terminating adjacent the top of the windshield opening, said arched member being formed of two principal pieces comprising left and right halves each piece of which is symmetrical with respect to the other and adapted to be disposed in a generally horizontal plane in juxtaposition end to end at the center of the arch each piece being of a generally hollow box-like cross section which is unclosed on itself at the lower rear corner, there being a substantially vertically disposed attaching flange portion forming the rear side of the box section of the piece and adapted to be secured to the roof panel, an overhanging visor portion diagonally related to the attaching flange portion to form a blended continuation of the downwardly sloping roof panel contour beginning at the juncture between the two-said box section portions, and a third generally curvilinear portion bent to a flat gutter shape and forming a substantially right angled juncture with the visor portion at one side of the gutter and extending at its opposite side to form a terminal anchoring flange at the noted lower rear corner, said box-like section of each principal piece of the arched member being of a tapering cross section decreasing from a maximum at the central portion of the arched member to a relative minimum at the extremities thereof, the box section proportions of the principal pieces at the center of the arch being proportioned such that their projected horizontal overhang is in excess of approximately 50% greater than the projected vertical depth at the center of the arch.

12. For use with a glass receiving windshield opening defined by a downwardly sloping roof panel and metal frame structure provided with a longitudinally recessed rubber reveal seal supported thereby along the four edges of the windshield opening, a combined reveal molding and permanent visor structure formed of pieces of bright sheet metal comprising an arched member adapted for disposition in a substantially horizontal plane adjacent the upper edge of the windshield opening, said arched member having depending legs at its opposite ends which conform to the sides of the windshield opening and being of a unitary hollow box-like cross section which is unclosed on itself at the lower rear corner, said box-like cross section incorporating a depending attaching flange portion forming the rear side thereof and adapted to be secured to the roof panel and anchored in a longitudinal recess in the reveal seal, an overhanging visor portion diagonally related to the attaching flange portion to form a blended continuation of the downwardly sloping roof panel contour beginning at the juncture between the two said box section portions, a generally horizontal third portion having its transversely opposite edges deflected diagonally upwardly with one edge forming an angled juncture with the visor portion and the opposite edge forming a terminal flange at the lower rear corner of the box-like section in converging angularity with respect to the anchored attaching flange portion and adapted to be anchored in another longitudinal recess in the rubber seal, said box-like section of the arched member being of a gradually decreasing cross section from a maximum at the central portion of the arch to a relative minimum at the legs thereof and a reveal molding side piece disposed end to end to each leg and being of a substantially identical cross section with respect thereto.

13. For use with a glass receiving windshield opening defined by a metal frame structure, said metal frame structure incorporating two vertically spaced depending roof panel flanges and including a longitudinally recessed reveal seal supported by the frame structure and conforming to the four edges of the windshield glass so as to seal the same, the combination of the depending roof panel flanges and a reveal molding and permanent visor structure formed of pieces of bright sheet metal, the last said structure comprising an arched member disposed in a substantially horizontal plane in juxtaposition to the depending roof panel flanges and having depending legs at its opposite ends adapted to conform to the sides of the windshield opening, said arched member being of a unitary hollow box-like cross section which is unclosed on itself at the lower rear corner, said box-like cross section being formed of a depending attaching flange at the rear side thereof and permanently secured to the upper roof panel flange and juxtaposed to the lower roof panel flange and being together adapted to share a common longitudinal recess in the seal, an overhanging visor portion diagonally related to the attaching flange portion to form a blended continuation of the roof panel beginning at the juncture between the two said box section portions, and a third generally curvilinear portion bent to a partially flat gutter shape to form an angled juncture with the visor portion at one side of the gutter and extending at its opposite side to form a terminal flange at the lower rear corner of the box-like section adapted to engage another longitudinal recess in the seal, said box-sectioned arched member being of a tapering cross section gradually decreasing from a maximum at the central portion of the arch to a relative minimum at the extremities thereof.

14. For use with a glass receiving windshield opening defined by a metal frame structure, the combination of two vertically spaced depending roof panel flanges incorporated in the metal frame structure and a longitudinally recessed reveal seal supported by the structure along the four edges of the windshield opening, and a combined reveal molding and permanent visor structure formed of pieces of bright sheet metal and comprising an arched member adapted for disposition in a substantially horizontal plane adjacent the depending roof panel flanges said arched member having depending legs at its opposite ends which conform to the sides of the windshield opening and being of a unitary hollow box-like cross section which is unclosed on itself at the lower rear corner, said box-like cross section being formed of a depending attaching flange portion at the rear side thereof and permanently secured to the depending upper one of the roof panel flanges, said upper flange and flange portion being adapted to receive an interposed reversely bent gutter member clamped therebetween, said flange portion and the lower roof panel flange being juxtaposed and together sharing a longitudinal anchoring recess in the seal, an overhung visor portion diagonally related to the attaching flange portion of the box-section to form a blended continuation of the roof panel beginning at the juncture between the two said box section portions, and a generally horizontally disposed third portion which is deflected upwardly at its transversely opposite edges to form a substantially 90° junction at one edge with the visor portion and to form a terminal flange at the opposite edge at the noted lower rear corner of the box-like section, said terminal flange being adapted to be anchored in another longitudinal recess in the seal, said box-like arched member being of a tapering cross section gradually decreasing from a maximum at the center of the arch to a relative minimum at the legs thereof.

15. For use with a glass receiving windshield opening defined by a downwardly sloping roof panel and metal frame structure provided with a longitudinally recessed deformable reveal seal supported thereby along the four edges of the windshield opening, a combined reveal molding and permanent visor structure formed of pieces of bright sheet metal and comprising a generally tubular member arched in a substantially horizontal plane adjacent the upper edge of the windshield opening and having depending legs at its opposite ends adapted to conform to the sides of the windshield opening, said tubular member being hollow and of a generally unitary construction forming a substantially complete enclosure, said tubular member incorporating a vertically disposed attaching flange portion defining the rear wall thereof and adapted to be secured to the roof panel, an overhanging visor portion diagonally related to the attaching flange portion to form a blended continuation of the downwardly sloping roof panel beginning at the juncture between the two just named portions, and a general horizontally disposed closing portion at the bottom having its transversely opposite edges deflected upwardly and outwardly with one edge integrally forming an angled juncture with the visor portion and the opposite edge forming a terminal flange at the lower rear corner of the box section and adapted to be anchored in a longitudinal recess in the deformable seal, said arched tubular member being of tapered cross section gradually decreasing from a maximum at the central portion of the arch to a relative minimum without overhang at the legs thereof, and a reveal molding side strip arranged end to end to each leg and being of a similar cross section without overhang.

16. For use with a glass receiving windshield opening defined by downwardly sloping roof panel and metal frame structure provided with a longitudinally recessed deformable reveal seal supported thereby along the four edges of the windshield opening, a combined reveal molding and permanent visor structure formed of pieces of bright sheet metal and comprising an arched member disposed in a substantially horizontal plane adjacent the upper edge of the windshield opening and having depending legs at its opposite ends adapted to conform to portions of the sides of the windshield opening, said arched member being of a general hollow box-like section forming a substantially complete enclosure and defined by a substantially vertically disposed attaching flange portion at the rear side of the box section and adapted to be secured to the roof panel, an overhanging visor portion diagonally related to the attaching flange portion to form a blended continuation of the downwardly sloping roof panel beginning at the juncture between the two said box section portions, and a general horizontally disposed closing portion having its transversely opposite edges deflected upwardly and outwardly with one edge forming an angled juncture with the visor portion and the opposite edge forming a terminal flange at the lower rear corner of the box section and adapted to be anchored in a longitudinal recess in the deformable seal, said arched box-like member being of tapered cross section gradually decreasing from a maximum at the central portion of the arch to a relative minimum at the legs thereof, reveal molding side strips supported by the deformable seal at the sides of the window opening each disposed end to end with the leg at that side and being of similar cross section with respect thereto, and a bottom reveal strip member arched in a substantially horizontal plane adjacent the lower edge of the windshield opening and having curved legs extending toward the sides of the opening and each terminating adjacent the bottom of the side strip at that side.

17. For use with a glass receiving windshield opening defined by downwardly sloping roof panel and metal frame structure provided with a longitudinally recessed deformable reveal seal supported thereby along the four edges of the windshield opening, a combined reveal molding and permanent visor structure formed of pieces of bright sheet metal and comprising an arched member arranged to be disposed in a substantially horizontal plane adjacent the upper edge of the windshield opening and having depending legs at its opposite ends adapted to conform to the sides of the windshield opening, said arched member being of a general hollow box-like section forming a substantially complete enclosure and defined by a substantially vertically disposed attaching flange portion at the rear side of the box section and adapted to be secured to the roof panel, an overhanging visor portion diagonally related to the attaching flange portion to form a blended continuation of the downwardly sloping roof panel beginning at the juncture between the two said box section portions, a general horizontally disposed closing portion having its transversely opposite edges deflected upwardly and outwardly with one edge forming an angled juncture with the visor portion and the opposite edge forming a terminal flange at the lower rear corner of the box section and adapted to be anchored in a longitudinal recess in the deformable seal, said arched box-like member being of tapered cross section gradually decreasing from a maximum at the central portion of the arch to a relative minimum at the legs thereof, said box-like section at the center of the arch having a projected horizontal overhang in excess of approximately 50% greater than the projected vertical depth thereof, reveal molding side strips supported by the deformable seal at the sides of the window opening each disposed end to end with the leg at that side and being of similar cross section with respect thereto, and a bottom reveal strip member curved to arch in a substantially horizontal plane adjacent the lower edge of the windshield opening and having bowed legs extending toward the sides of the opening and each terminating adjacent the bottom of the side strip at that side.

18. For use in association with a roof panel and a windshield having adjacent portions and having rubber seal means therebetween to form a common water-tight juncture, a combined reveal molding and windshield visor structure of open sided hollow cross section tapered from the mid portion thereof laterally toward each of its opposite end portions, said structure adapted to be secured to the roof panel and having a bottom closing portion arranged to extend forwardly from a location of engagement with the seal means, a backwardly inclining front visor portion extending rearwardly from a juncture with the front of the bottom closing portion and toward said roof panel portion, said visor portion having a downturned and reversely bent flange for confronting said roof panel in close adjacency thereto, and means for attaching said structure to said roof panel.

19. For use in conjunction with the windshield pillar and roof structure in a vehicle which is provided with a windshield opening, said structure including a laterally extending windshield and a roof panel having adjacent portions and having interposed rubber seal means effective to form a common water-tight juncture therebetween: a combined reveal molding and windshield visor device of hollow cross section tapering from the mid portion thereof laterally across the windshield structure toward the opposite end portions of the device, said device adapted at its bottom and top to engage said seal and said roof panel respectively, and having means including threaded fasteners for attaching the device to said vehicle structure.

References Cited in the file of this patent

UNITED STATES PATENTS

| | | |
|---|---|---|
| 1,731,602 | Widman | Oct. 15, 1929 |
| 1,798,245 | Ames | Mar. 31, 1931 |
| 2,066,500 | Westrope | Jan. 5, 1937 |
| 2,160,068 | Graebner et al. | May 30, 1939 |
| 2,189,138 | Eichner | Feb. 6, 1940 |
| 2,289,144 | Rossell et al. | July 7, 1942 |
| 2,620,221 | Romano | Dec. 2, 1952 |
| 2,624,614 | Kramer | Jan. 6, 1953 |

FOREIGN PATENTS

| | | |
|---|---|---|
| 674,639 | Germany | Apr. 18, 1939 |

(Corresponding U. S. 1,862,022, June 7, 1932.)